United States Patent

Zinn

Patent Number: 5,757,722
Date of Patent: May 26, 1998

[54] METHOD FOR VERIFYING THE LOCATION OF AN ARRAY OF DETECTORS

[75] Inventor: Noel Donald Zinn, Missouri City, Tex.

[73] Assignee: Western Atlas International, Inc., Houston, Tex.

[21] Appl. No.: 859,867

[22] Filed: May 21, 1997

[51] Int. Cl.$^6$ .................................................. G01V 1/38
[52] U.S. Cl. .................................................. 367/19
[58] Field of Search ............................ 367/19, 129, 127, 367/130

[56] References Cited

U.S. PATENT DOCUMENTS

| | | | |
|---|---|---|---|
| 4,446,538 | 5/1984 | Zachariadis | 367/19 |
| 4,641,287 | 2/1987 | Neeley | 367/19 |
| 5,128,904 | 7/1992 | Chambers | 367/129 |
| 5,497,356 | 3/1996 | Norton, Jr. et al. | 367/6 |
| 5,696,733 | 12/1997 | Zinn et al. | 367/19 |

OTHER PUBLICATIONS

Geodetic Glossary, National Geodetic Survey; Rockville, MD; Sep., 1986; 2 pages.

Cross, P.A.; Advanced Least Squares Applied To Position-Fixing, Working Paper No. 6, North East London Polytechnic, Department of Land Surveying, Apr. 1983, pp. 115–124.

Primary Examiner—Ian J. Lobo
Attorney, Agent, or Firm—William A. Knox

[57] ABSTRACT

A high-order, polynomial regression curve is fitted to a global set of first-arrival pick times as a function of the nominal ranges between a plurality of acoustic sources having known geodetic coordinates and a plurality of acoustic detectors whose coordinates are imperfectly known. The polynomial is applied to the pick times to provide pick time distances with the vertical velocity gradient removed. The known source coordinates, the nominal detector coordinates and the pick time distances are combined to provide a quadratic surface to provide a common data block containing the coefficients for modeling the lateral velocity gradient. Using the so-determined coefficients, the imperfectly-known detector positions are iteratively updated using the Helmert blocking technique.

6 Claims, 10 Drawing Sheets

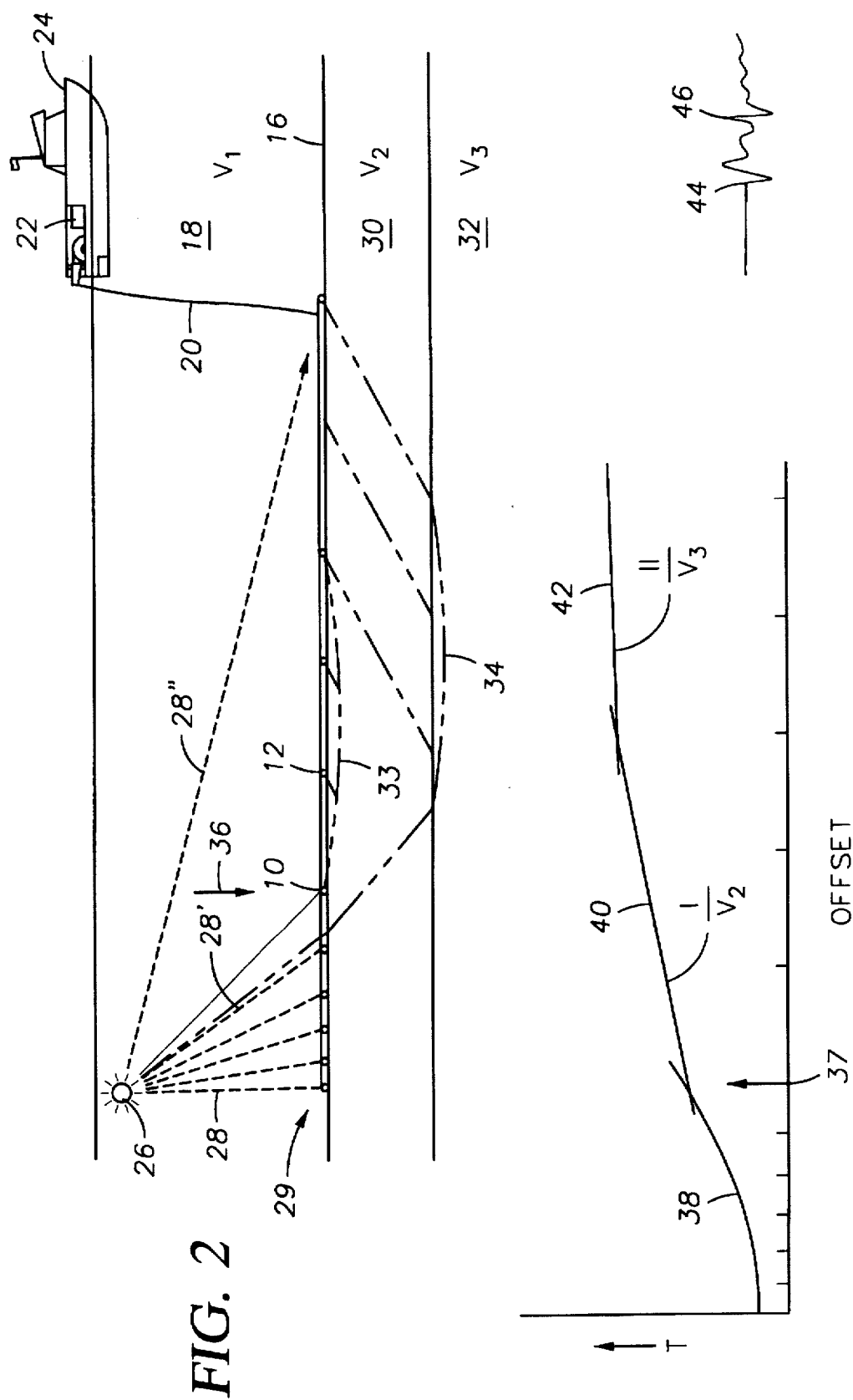

5,757,722

METHOD FOR VERIFYING THE LOCATION OF AN ARRAY OF DETECTORS

RELATION TO OTHER APPLICATIONS

This application is related to U.S. Pat. Mo. 6,696,733, filed Oct. 30, 1996 in the names of Noel Zinn and Ronald E. Chambers and assigned to the assignee of this application.

BACKGROUND OF THE INVENTION

1. Field of the Invention

A method for refining the location, relative to known source or detector positions, of the individual members of an array of detectors or sources.

2. Discussion of Relevant Art

Although this method may be applied to land or marine seismic exploration, the method will be described by way of example but not by way of limitation, in terms of shallow-water marine seismic surveying. The exemplary situation envisions the source locations to be accurately known while the detector locations are uncertain. Of course, the reverse situation may hold, that is, the source locations may be the uncertain parameters.

As is well known in the Geophysical Profession, a sound source of any desired type radiates a wavefield into the earth from a each of a plurality of areally-disposed source locations according to a prescribed operational sequence. A plurality of spaced-apart seismic detectors are deployed in an areal pattern or array over the region of interest. The detectors receive the respective wavefields after the wavefields have traveled from the source(s) to the receiver(s) along various trajectories. As is well known, the sensors convert the mechanical earth motions due to direct, refracted and reflected seismic waves to electrical signals. The electrical signals representative of the seismic events are transmitted by any desired means to a recording apparatus. There, the electrical analog signals comprising the seismic data are digitized and recorded on an archival storage medium such as magnetic tape or floppy disc, for delivery to a data processing center. The resulting seismic data are processed, preferably by a programmed computer, to provide a geologic model of the subsurface of the earth in the region of interest. Commonly, the model is three-dimensional in terms of east and north coordinates horizontally and in depth along the vertical axis. From inspection of the geologic model of the subsurface, one can take steps to exploit the natural resources resident thereat for the benefit of humankind.

In a marine seismic survey in water depths of 200 meters or less, the seismic sensors are often emplaced directly on the sea floor by a cable boat before beginning the survey. The respective sensors are electrically coupled to signal-transmission means incorporated in one or more bottom cables. The ends of the cable(s) are adapted to be recovered by a recording boat for connection to a recording apparatus mounted thereon. The detector output signals, due to wavefield insonification of the subsurface by one or more sound sources mounted on a shooting boat, are then recorded as explained in the previous paragraph.

During the progress of a survey, the shooting boat visits in sequence each one of a plurality of designated, regularly-spaced source stations disposed in the area of interest. The geographic location of the shooting boat and hence also the acoustic source, can be measured very accurately by use of, for example, GPS satellite positioning equipment mounted on the boat.

Satellite positioning for the cable boat(s) is available so that a detector or sensor and associated cabling may be dropped into the water at nominally-designated sensor locations. But there is no assurance that a sensor, fluttering down through several hundred feet of water, will actually land at the desired position on the sea floor. Because the detectors and cables may be laid out many days or weeks before the actual survey operation begins, sea currents may displace the detectors or the nets of fishing boats may snag and drag them from their assigned stations. Because they are submerged, GPS positioning data are not available to the detectors.

Thus, although the position of the source may be known accurately and the position of the cable boat at the time of detector drop may also be known, the actual location of a detector on the water bottom is not necessarily known, only its "nominal" location, meaning a location such as might be selected from a wish list. Because of that uncertainty, the true geographic location of the geologic earth model derived from the resulting seismic data may be fraught with error. Workers in the profession have devised various methods for verifying the detector locations for ocean bottom cable arrays.

U.S. Pat. No. 4,446,538 issued May 1, 1984 to R. G. Zachariades teaches an acoustic positioning system for locating a marine bottom cable at an exploration site. The cable employs a plurality of hydrophones in spaced-apart positions along the cable. A marine vessel measures water depth to the cable as the vessel passes over the cable and then interrogates the hydrophones with sonar pulses along a slant range as the vessel travels along a parallel horizontally offset path to the cable. The location of the hydrophones is determined from the recordings of the water depth and the slant range. There is a disadvantage to that system, in that the auxiliary boat must make two passes over the cable, one pass to determine water depth and the second pass to generate a set of slant ranges.

Another method for locating a bottom cable is taught by W. P. Neeley in U.S. Pat. No. 4,641,287, issued Feb. 3, 1987. Here is disclosed a method for locating an ocean bottom seismic cable wherein a series of shots from a seismic pulse generator are fired. The distance to one seismic pulse detector is determined for each shot by defining spherical surfaces upon which the detector may be located. The intersection of the spherical surfaces determines the exact location of the detector. Depth detectors may be used to eliminate half the possible locations for each shot. In both of the above methods, in relatively shallow water where such bottom cables are used, the range measurements depend on measuring the elapsed time of a first-arriving acoustic pulse that has traveled directly through the water from source to detector and upon knowledge of the water velocity.

A somewhat different location-verification approach is taught by U.S. Pat. No. 5,128,904, issued Jul. 7, 1992 to Ron Chambers and assigned to the assignee of this invention. A method is disclosed for determining the separation between a seismic energy source and a seismic sensor whose location is known imperfectly. After the source emits a wavefield, the first-arriving impulse at the sensor is statistically processed to form a range statistic that is related to the travel time between the source and the sensor. A set of range statistics from a plurality of source positions are filtered and converted to range loci, the intersection of which marks the location of the sensor.

A method for verifying the location of a seismic bottom cable in real time is taught by J. P. Norton Jr. in U.S. Pat. No. 5,497,356, issued Mar. 5, 1996, and assigned to the assignee of this invention. In this teaching, one or more slave transponders are secured to selected sections of a seismic bottom cable whose location is imperfectly known. A master transponder broadcasts an interrogation pulse from each of a number of different known locations distributed along a line of survey. In response to an interrogation pulse, a slave transponder emits an encoded reply signal that is received by the master transponder. The acoustic flight time between each pulse broadcast and the encoded-signal reception constitutes a range measurement in the participating slave transponder. Resolving a gather of several range measurements from different known broadcast locations, focussed on an identifiable transponder, defines the transponder's location. The disadvantage of this method resides in the need for special equipment, such as a sonar-type master transponder and special cable-mounted slave transponders, not necessarily found on a typical shallow-water field crew. Use of this method is limited to two-way ranges of about 500 meters, a limitation that is not helpful when detector arrays may extend for several kilometers. It is of interest that the '356 patent operates with direct arrivals, estimating ranges from the vertices of the hyperbolic arrival-time pattern. That patent denigrates the use of refracted arrivals in determining valid range measurements.

There is a need for a process for locating one or both members of a seismic source/detector pair relative to a known geodetic position. The process must be economical and require no special field equipment.

SUMMARY OF THE INVENTION

This invention provides a method for defining the real locations of the members of an array of detectors. The detectors are deposited at nominal locations, $D_i$, on the bottom earth formation beneath a body of water. The detectors are in communication with a seismic signal processing system through a signal transmission means of any desired type. An acoustic source is caused to sequentially visit each of a plurality of source locations which occupy known geodetic locations $SR_j$. At each source station, the source launches an acoustic wavefield. A set of nominal ranges, $R''_{i,j}$ is determined between every known source location, $SR_j$, and every nominal detector location, $D_i$. With the aid of the signal processing system, detector signals are measured that are representative of the minimum wavefield travel times between every known source station and every nominal detector location to define a set of pick times, $P_{i,j}$ corresponding to the set of nominal ranges $R''_{i,j}$. With the aid of the signal processing system, a global polynomial regression curve of the $R''_{i,j}$ is fitted on the $P_{i,j}$ to define pick time distances (ptd) with a vertical velocity trend removed. Using the known source coordinates, the nominal detector coordinates and the pick time distances, a quadratic surface that is, a two-dimensional, second-order polynomial is formulated with the aid of the data processing system to provide a common block that contains the coefficients for providing a model of the lateral velocity gradient. Using the common-block coefficients, the network of nominal detector locations is iteratively updated until the difference between the nominal detector coordinates and the updated coordinates converges to a preselected limit.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2 is a schematic view of a cross section of the earth, showing various trajectories followed by sound waves propagating through the earth after insonification by a sound source;

FIG. 3 is a schematic travel-time/range refraction graph that might result from the geometry of FIG. 2;

FIG. 4 is an illustration of first and second arrivals as might be seen on an oscillographic time scale trace;

DETAILED DESCRIPTION OF THE PREFERRED EMBODIMENT

There follows now, a brief tutorial in association with FIGS. 1–4 to aid in the understanding of the method of this invention and to define the terminology adapted herein.

Figure 1:
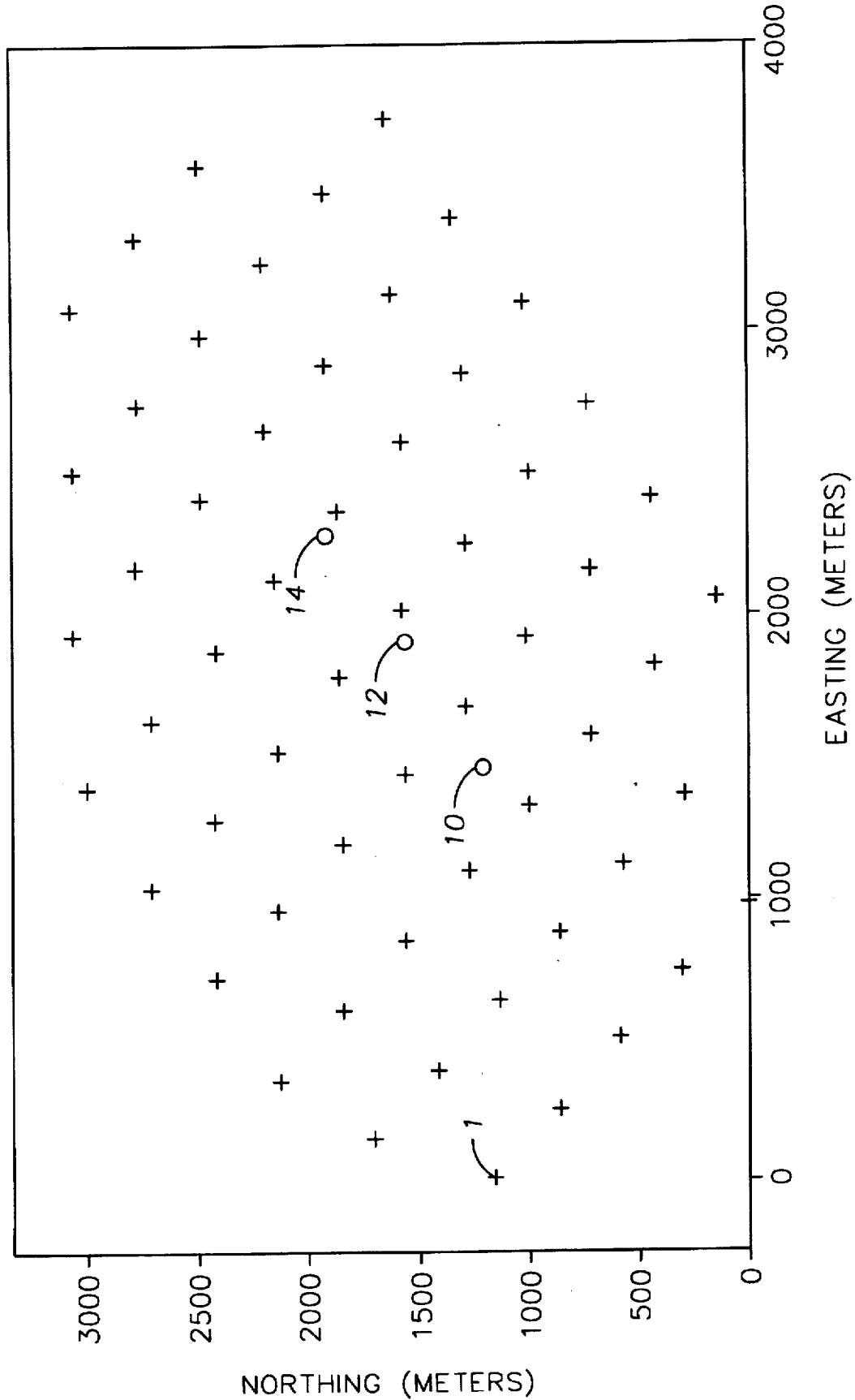
FIG. 1 is a plan view of an exemplary area undergoing a survey including a plurality of 61 sources (x's) surrounding an array of 3 detectors (o's)

Referring first to FIG. 1, there is shown a synthetic field layout of the acoustic source stations (x's) such as reference number 1 and detectors (o's), such as 10, 12 and 14 as might be used, for example, in a 3-D seismic survey of an area of interest. The coordinates are shown as northings and eastings, in meters, from an arbitrary origin. The exemplary survey area occupies about nine square kilometers. There are 61 source-station locations distributed over the area, where a sound source sequentially visits each of the locations to insonify the array of 3 detectors. The westernmost detector is identified by the reference numeral 1.

In FIG. 2 a plurality of seismic detectors such as 10, 12 and 14 (small circles) have been emplaced at nominal locations on the earth formation 16 at the bottom of a water layer 18. The detectors are in communication, via transmission means 20 with a seismic signal processing system 22 which may be mounted on a vehicle of any desired type such as a boat 24. Alternatively, the processing system could be installed in a land-based processing center such that the boat merely records the data on a suitable recording medium which is then shipped to the processing center for processing. A mobile acoustic source 26 of any desired type, sequentially visits the respective source stations such as shown in FIG. 1, which occupy known geodetic positions. A wavefield is launched from each of the respective source stations and received by all of the detectors after each launching.

Possible ray paths for the direct-path wavefield component are shown in FIG. 2 by short dashed lines such as 28, 28' and 28". A refracted ray path propagating through layer 30 is shown as a solid line 33. A refracted ray path through a deeper layer 32 is shown by long dashes 34. The ray paths associated with reflected arrivals, not being germane to this disclosure, are not shown.

Upon launching of a wavefield, the first-arriving pulses will be direct arrivals traveling along slant paths such as 28, 28'. If the travel time is plotted against the detector ranges from the sub-source point such as at 29, they will form one branch of a hyperbola. As is well known from refraction theory, at some point such as 36, termed the critical distance, the first arriving signals propagate along a refracted path such as 33. The critical distance is a function of the ratio of velocities $V_1$ and $V_2$, the velocities of the water and the water-bottom material respectively. Given a second refracting earth layer, arrivals from that layer become the first arrivals at greater ranges.

FIG. 3 is a schematic plot of first-arrival travel times plotted against range between a source and a detector. The direct arrivals, falling along curve 38, ahead of the critical point 37, exhibit hyperbolic curvature if left uncorrected for slant distance. Beyond the critical point 37, the direct arrivals become second events. If the events can be traced to the far field such as to detector 14 along ray path 28", the direct-arrival curve would become asymptotic to the hyperbola, the line having slope $1/V_1$.

Beyond critical point 37, the first arrival travel times fall along a straight line, 40, having a slope of $1/V_2$ assuming an isotropic, flat-lying water-bottom layer 30. As the profile is extended farther from the source 26, arrivals from a deeper refracting layer 32 now appear as first arrivals as shown by the breakover at line 42 whose slope is $1/V_3$. Refracted signals from layer 30 now become second arrivals and the direct arrivals is present will be third arrivals. The first arrivals as illustrated exhibit crisp straight-line segments. If however, the subsurface strata are relatively thin with not much velocity contrast between layers and if the data are noisy, the first-arriving wavefields from deep-lying refractors will appear to lie along a high-order polynomial curve rather than along a series of straight-line segments.

In the context of this disclosure, an apparent high-order polynomial curve derived from first refracted arrivals will be referred to as the vertical velocity gradient. It is necessarily a function of both depth and source-to-detector range. In addition, there may also exist a residual lateral velocity effect due to purely horizontal velocity variations due to wavefield propagation within a near-surface layer(s). It is that latter phenomenon that is of concern in this application.

FIG. 4 represents the initial portion of a time scale trace used for recording the arriving events of the propagating wavefield. A first-break transient or pick is indicated at 44. In the absence of noise or instrumental interference, the transient is clean and unambiguous as shown. A secondary-event arrival is shown at 46 such as might be due to a direct wavefield arrival from beyond the critical point 37.

As earlier indicated, the purpose of this invention is to provide a method for updating the nominal location of one or both members of a seismic source/detector pair. Given a precisely-known location for one of the members of the pair and an accurate measure of the wavefield traveltime between the members of the pair, the range between the two can be calculated if the propagation velocity characteristic of the material along the wavefield trajectory (the travel path) is known or can be determined. From several such ranges, the location of the imperfectly-located member of the pair can be defined by multi-lateration (sometimes incorrectly referred to as triangulation). If the locations of both members of the pair are uncertain, certain well-known statistical filtering methods, such as Kalman filtering, are available.

In the Norton Jr. reference earlier cited, multi-lateration using direct arrivals of sonar-like pulses were used to relocate detector drop locations. As explained earlier, one disadvantage to that method is the complex calculations needed to handle the hyperbolic trajectories. Another problem was a limitation in range to line-of-sight or about 250 meters one way. Because large areal surveys extend for many kilometers, that method had severe limitations.

The "nominal range" means the distance between a source station and the nominal location of a detector. The nominal range is computed by inversion of the source-station coordinates and the nominal detector coordinates by standard surveying methods. The term "global" means that every combination of travel time and nominal range has been plotted. The term pt or "pick time" means the travel time of the first-arriving seismic transient, at a detector, resulting from a wavefield launching and which has propagated along a minimal-time refracted trajectory. The term "ptd" means the pick time distance between a source and a detector as computed from the pick time and the velocity taken from a global regression curve. The terms "vertical" and "lateral" as referred to refracted velocities, were earlier defined.

Every pick time $P_{i,j}$ is identified as to source station of origin, $SR_j$ ($j=1, \ldots, n$) and nominal detector location $D_i$ ($i=1, \ldots, m$). Thus in this example, for every detector $D_i$, there is an associated set of 61 detector-specific pick times $P_{i,j}$. For every source station, there is an associated set of 3 source-specific pick times, $P_{j,i}$, providing 183 data.

Figure 5:
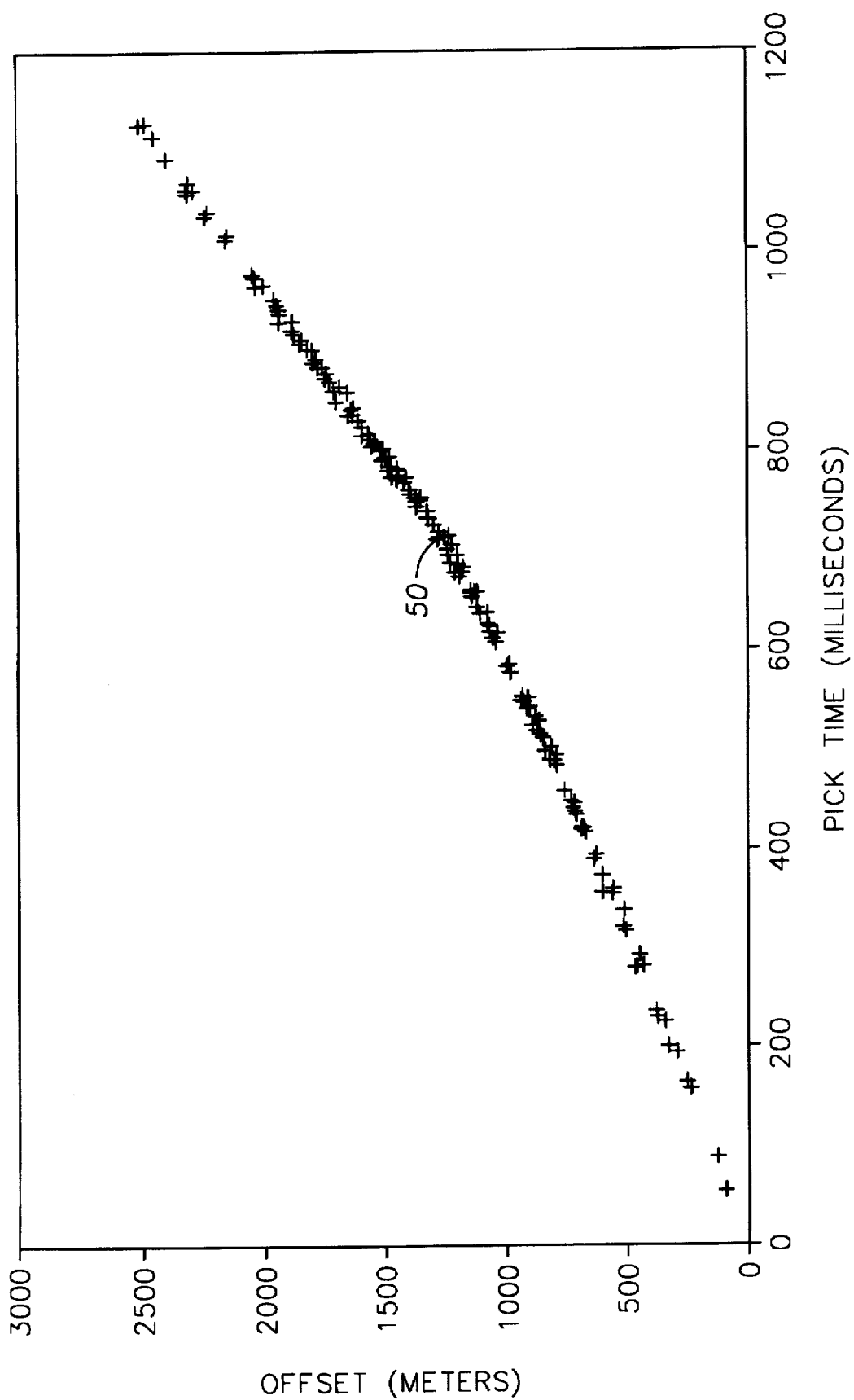
FIG. 5 is a plot of nominal ranges vs. pick times.

I have found that it is possible to fit a global statistical polynomial regression curve of the nominal ranges between detectors and sources on the travel times of first-arriving refracted events such as shown in FIG. 5. The data plotted in FIG. 5 comprise a raw global graph of first-arriving travel times, defined as pick times $P_{i,j}$, plotted against the nominal ranges, $R_{i,j}$, between the plurality of source stations and each member of the line of 3 detectors of FIG. 1.

In FIG. 5, the first-arriving travel times in milliseconds (horizontal axis) between every combination of source station and detector as shown in FIG. 1 are plotted against the nominal range in meters (vertical axis) to create a raw regression plot 50. Since there are 61 sources and 3 detectors, there are 183 observed data. The plot probably includes some early direct arrivals but for the most part they are believed to comprise refracted travel times through one or more shallow refractors. The term "shallow" means a refractor depth beneath the water-bottom surface that is less than the water thickness above the water-bottom. For purposes of this disclosure but not by way of limitation, data within 3000 meters of the nominal positions of the detectors will be selected for processing.

Figure 6:
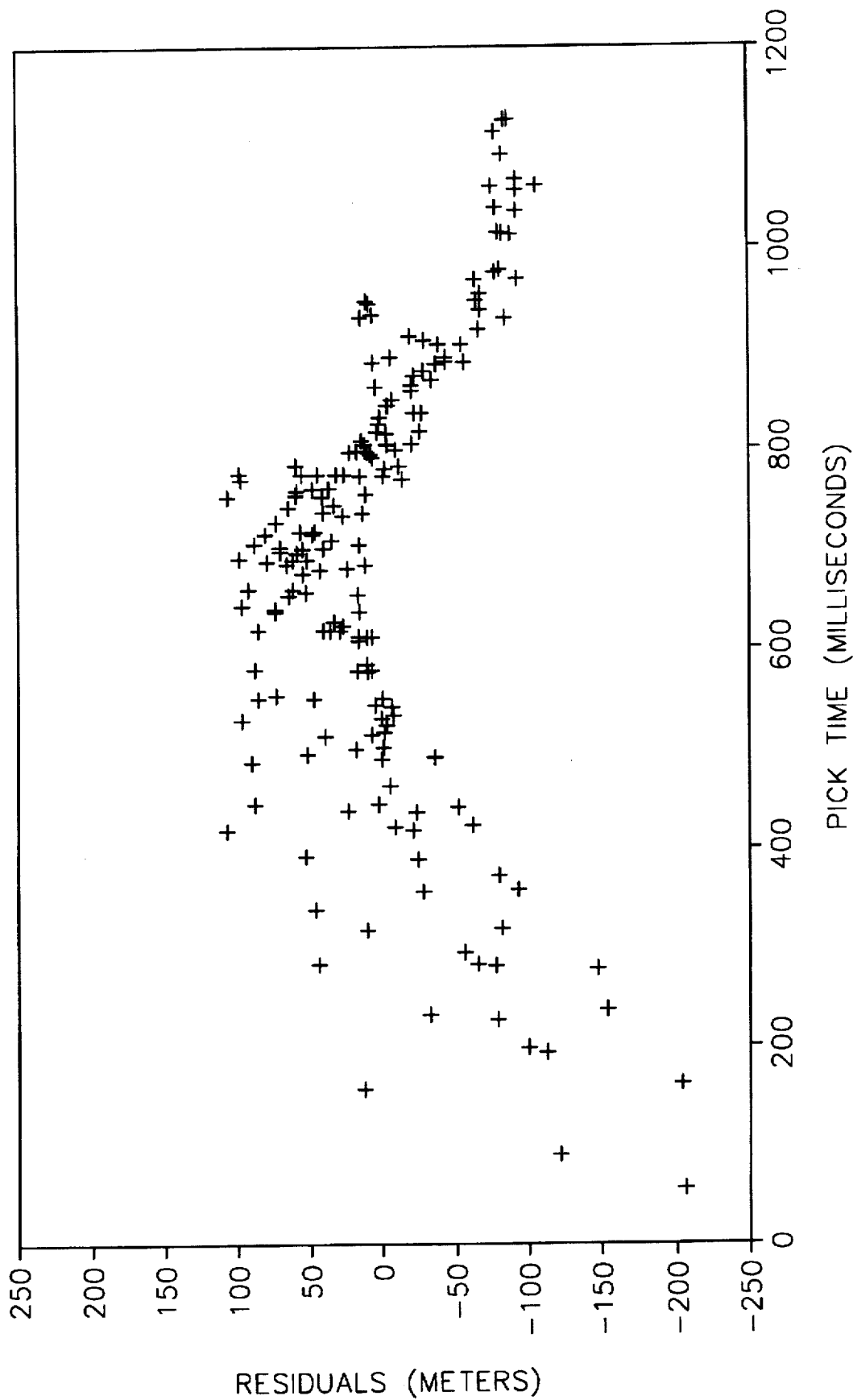
FIG. 6 shows the residual differences between the calculated ranges and the true ranges using a least-squares linear regression plot.

FIG. 6 shows the range residuals computed from the pick time distance computed from a first-order linear regression curve relative to the true ranges. A velocity gradient derived from a conventional linear global regression velocity trend is clearly inadequate.

A high-order polynomial regression curve having the form:

$$f(v,t)=c_0+c_1t+c_2t^2+ \ldots +C_k t^k,$$

can be fitted through the plotted points, 50, FIG. 5, where t is the observed pick times and the $c_i$ are coefficients.

Figure 7:
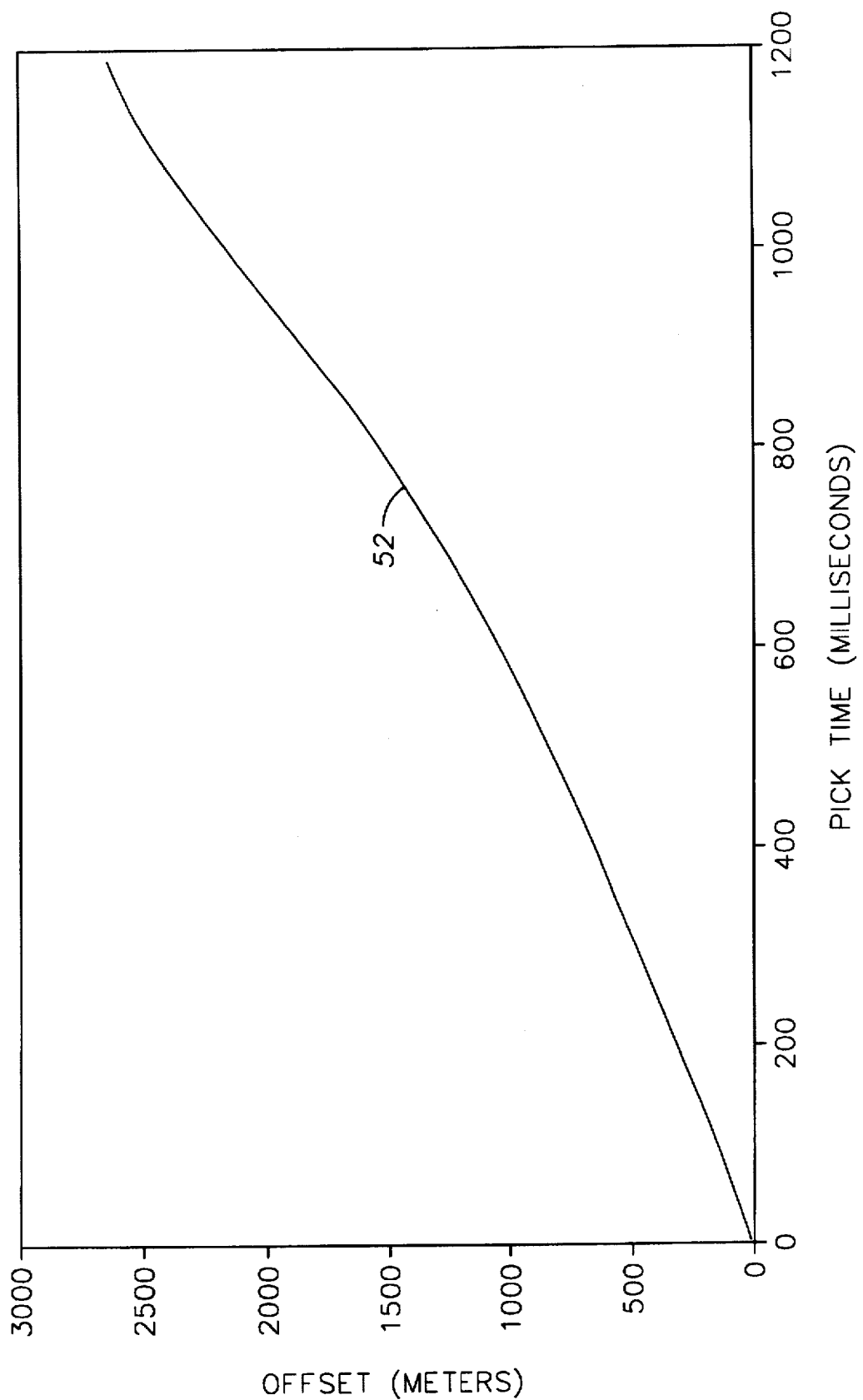
FIG. 7 is a fifth-order vertical polynomial curve for the data from FIG. 5.

Inspection of the average trend 50, FIG. 5, of the plotted points reveals a break in slope at a nominal range of about 600 meters such as might be due to arrivals through a second deeper refractor. A regression curve 52, FIG. 7, is fitted through all of the plotted points 50, FIG. 5. Curve 52, taken as a whole, is best referred to as a quasi-velocity function because the velocities that define its coefficients originate from various trajectories having dissimilar geometries.

By use of the seismic data processing system 22, which may be a programmed computer, a high-order polynomial regression curve of nominal ranges $R_{i,j}$ on pick times $P_{i,j}$, is fitted to the data. Any well-known statistical processing routine may be used for that purpose to produce curve 52 of FIG. 7 as before illustrated. The order of the polynomial is selected as that order which minimizes the residuals about the regression curve on a least squares basis. The fifth-order polynomial shown below, best fits the data distribution of FIG. 5:

$$pvt = 12.01 + 1.1488pt + 0.0031558pt^2 - 7.09e^{-.006}pt^3 + 1.0998e^{-.08}pt^4 - 4.3927e^{-.01}pt^5 \quad (A)$$

and is plotted, as before stated, in FIG. 6 as curve 52 which defines the vertical velocity model.

Outliers, that is random data that grossly depart from the main data sequence, are rejected in the curve-fitting process. Due to excessive shot-generated noise, pick times received by detectors near a source may be distorted by unwanted transients such as direct arrivals and shot noise. At extreme ranges, where the signal-to-noise ratio is very low, the pick times may be too noisy to be useful and/or the arrivals may have propagated along refracted paths that are too deep to be of use for geodetic purposes. Therefore, range data acceptable for determining the polynomial optionally may be truncated between preselected range limits with the range maxima being designed to confine the wavefield arrivals to those having propagated along shallow refracted trajectories as before discussed with the range minima being designed to exclude direct water arrivals.

Figure 8:
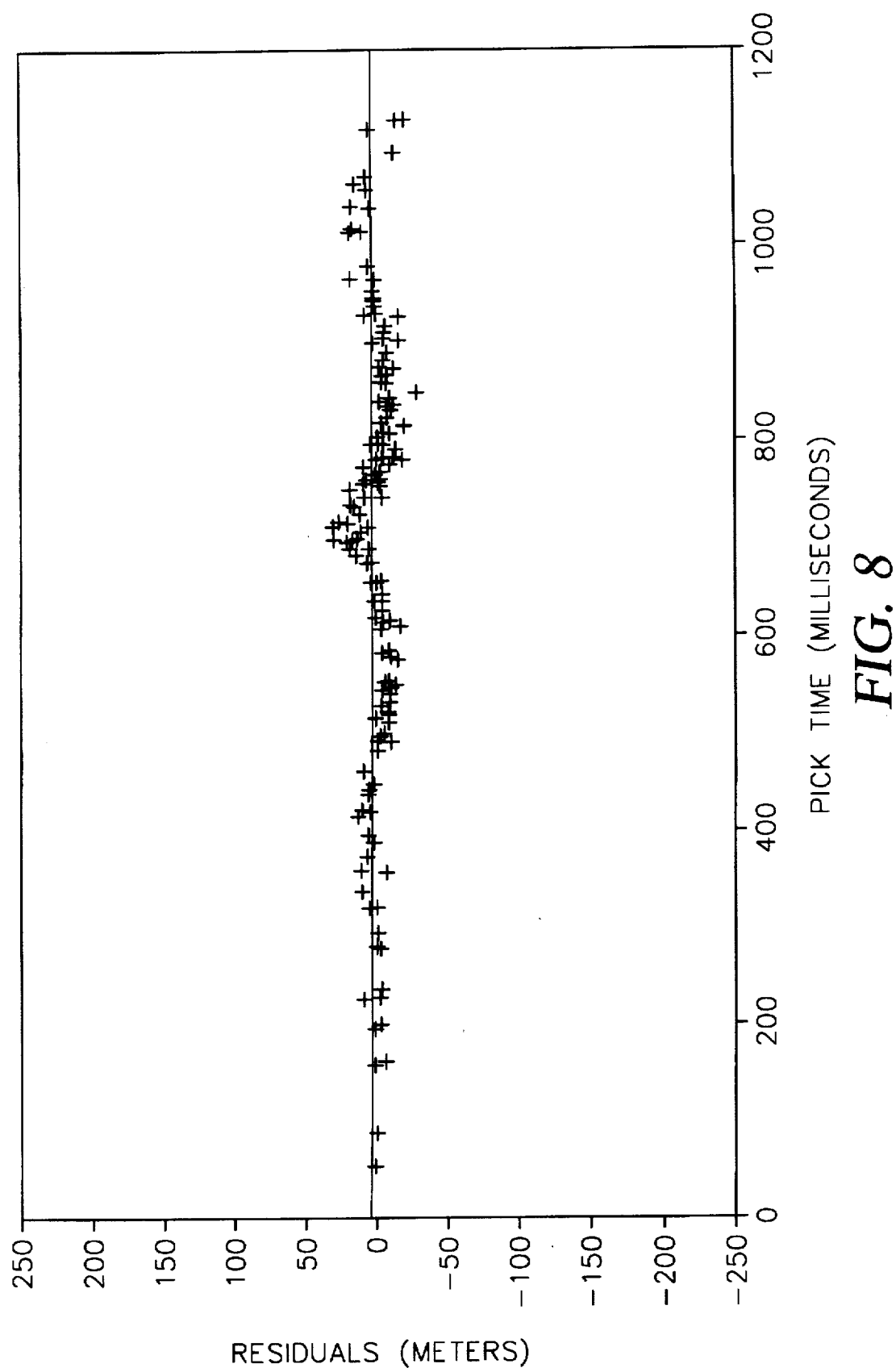
FIG. 8 illustrates the residuals after application of the polynomial of FIG. 7.

FIG. 8 is the global vertical velocity gradient residuals after application of the curve 52, FIG. 7, to the data of FIG. 5. The residual range errors are considerably reduced compared to FIG. 6, although substantial residuals remain in the range of about 0.500 to about 0.900 second.

Ranges are computed from the global regression curve for all source-detector trajectories. Although the global curve will closely model the vertical velocity gradient over the area as a whole, residual lateral velocity gradients will disturb the global model as shown by the residual anomalies in FIG. 8 at about 0.600 to 0.900 second. The lateral gradient will behave like a scale factor that biases map coordinates in the direction of the gradient. It is proposed to update the observation positioning equation to include the lateral velocity gradient due to the spatial velocity variation. By way of example but not by way of limitation, the velocity model will be directed to updating the detector locations by providing coordinate-specific velocities derived from simultaneous refinement of the global regression velocity function.

A lateral residual velocity gradient may be approximated as a two dimensional quadratic surface defined by a two-dimensional polynomial in spatial coordinates over the region of interest, for example $$pvt = b_0 + b_1 x + b_2 y + b_3 x^2 + b_4 x^2 + b_5 xy, \quad (1)$$

where pvt=point velocity trend, x and y are coordinate points in the region, $b_i$ are polynomial coefficients common to the region.

If the possibility of a residual lateral velocity gradient is allowed, then the pick time distance (ptd) between two points previously established by the global regression polynomial is $$ptd = [(x_2 - x_1) + (y_2 - y_1)]^2 / V, \quad (2)$$

where v is the average relative velocity over the travel path.

The differential distance, ds, between two points in x,y coordinates is $$ds = [dx^2 + dy^2]^{1/2} = [(1 + \{(y_2 - y_1)/(x_2 - x_1)\}^2]^{1/2} dx. \quad (3)$$

For purposes of mathematical convenience, redefine pvt from equation (1) as its inverse, PVT=1/pvt, that is, the inverse of the lateral velocity gradient as actually modeled. One is easily mapped into the other. The travel time dt of a wavefield across the interval ds is $$dt = ds/PVT, \quad (4)$$

where PVT is understood to vary over the path from point $p_1$ to point $p_2$. The total time may be found by integrating the function from $p_1$ to $p_2$. The integration may be simplified by another substitution, the slope-intercept of a straight line:

$$Y = [(y_2 - y_1)/(x_2 - x_1)] x + (x_2 y_1 - x_1 y_2)/(x_2 - x_1). \quad (5)$$

Y is a function of x and the coordinates of the end points of the line ds and are treated a known in this context. The quantity x is a specific point on the differential line, ds, and Y is the corresponding coordinate along the y axis.

The total relative travel time, T, between points $p_1$ and $p_2$ can be found by integrating (3) from $x_1$ to $x_2$:

$$T = \int_{x_1}^{x_2} (a_0 + a_1 x + a_2 Y + a_3 x^2 + a_4 Y^2 + a_5 xY) ds \quad (6)$$

after making the above substitutions. The integral may be solved using any one of a number of known computer-aided software programs to yield:

T=SM, where $$M = ((6a_0 + 3a_1(x_1 + x_2) + 3a_2(y_1 + y_2) + 2a_3(x_1^2 + x_1 x_2 + x_2^2))/6) + (2a_4(y_1^2 + y_1 y_2 + y_2^2) + a_5(x_1(2y_1 + y_2) + x_2(y_1 + 2y_2))/6) \quad (7)$$

and S is the distance between $p_1$ and $p_2$. Substituting (7) into (3), $$ptd = \{((x_2 - x_1)^2 + (y_2 - y_1)^2)^{1/2}\} \times M \quad (8)$$

In the case of detector positioning, the coefficients of a design matrix are the partial derivatives of ptd with respect to the two detector coordinates and the six polynomial coefficients. A simplifying assumption is that the detector coordinates in (7) can be held fixed while differentiating with respect to those coordinates in the other term, the Pythagorean term S. Coordinate errors in (7) have only a small effect on the velocity gradient and if ignored their effect will be redefined as the algorithm converges. The eight design matrix coefficients are:

$$\partial(ptd)/\partial(x_1) = (x_2 - x_1) M/S \quad (9)$$

$$\partial(ptd)/\partial(y_1) = (y_2 - y_1) M/S \quad (10)$$

$$\partial(ptd)/\partial(a_0) = S \quad (11)$$

$$\partial(ptd)/\partial(a_1) = (x_2+x_1)S/2 \quad (12)$$

$$\partial(ptd)/\partial(a_2) = (y_2+y_1)S/2 \quad (13)$$

$$\partial(ptd)/\partial(a_3) = (x_1^2+x_1x_2+x_2^2)S/3 \quad (14)$$

$$\partial(ptd)/\partial(a_4) = (y_1^2+y_1y_2+y_2^2)S/3 \quad (15)$$

$$\partial(ptd)/\partial(a_5) = (x_1(2y_1+y_2)+x_2(y_1+2y_2))S/6 \quad (16)$$

The above eight equations are sufficient to solve for a linear velocity gradient simultaneously in two coordinates or by a more efficient network adjustment method similar to that used in well-known geodetic adjustment methods, from the matrix $$r = H \times p + E, \quad (17)$$

where r=183×1 column vector of residuals (computed−observed pick time distance);

p=12×1 column vector of unknown parameters (3 detectors time 2 coordinates each plus 6 coefficients);

E=183×1 column vector of unknown errors to be minimized;

H=183×12 design matrix of coefficients as computed from equations (9) through (16).

Each of the 183 rows of length 12 will consist of just eight non-zero elements, one each for the two coordinates of the two detectors and six for the polynomial coefficients, always in the same columns. Because the lateral velocity gradient is common to the entire region of interest, that is, the polynomial coefficients are represented in every observation equation, it is necessary that all detectors be solved in a simultaneous network adjustment.

The solution to (17) is $$p = (H'\times H)^{-1} \times H' \times r, \quad (18)$$

where H' is the transpose of H. Due to the need to remove the non-linearities of the observation equation and the approximations made in deriving the partials for the polynomial coefficients in the design matrix, the algorithm must be iterated to convergence.

The solution to the residual lateral velocity gradient is a two-dimensional function and, for the example of FIGS. 1 and 5 is:

$$pvt = -98.063 + 9.491e^{-007}X + 6.8051e^{-006}Y - 7.091e^{-010}X^2 + 2.1221e^{-009}Y^2 + 4.334e^{-010}XY \quad (19)$$

where X and Y here represent coordinates. Formulation (19) is the lateral velocity model.

Figure 10:
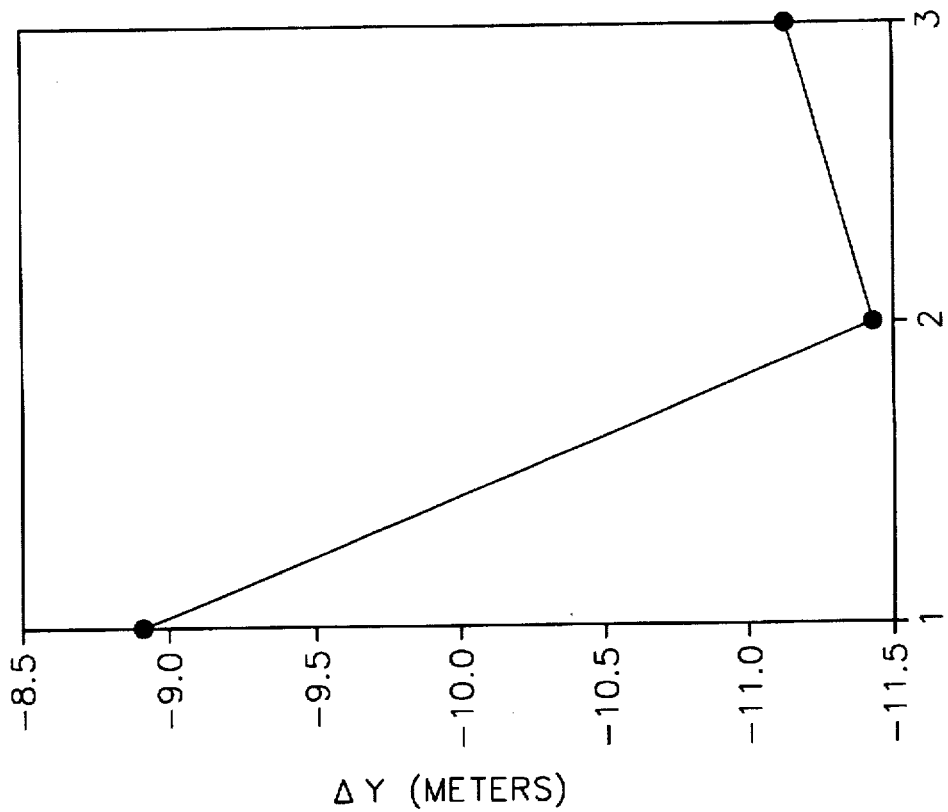
FIGS. 9 and 10 are, respectively, the error in the x and y coordinates for the three detector positions after application of the vertical velocity gradient of FIG. 7.
Figure 9:
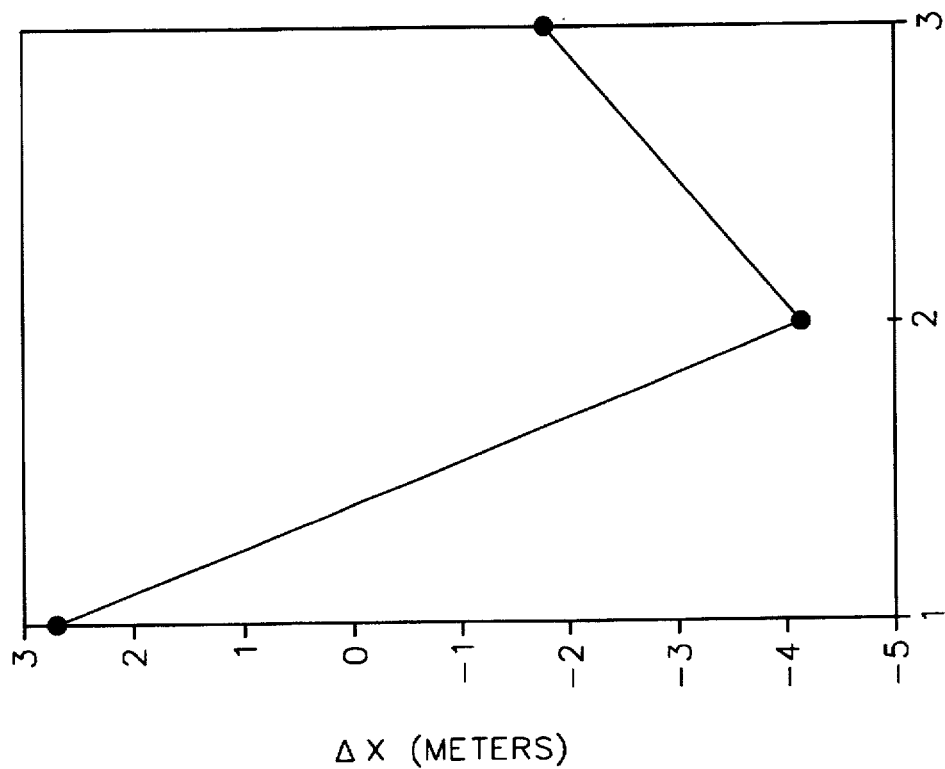
Figure 12:
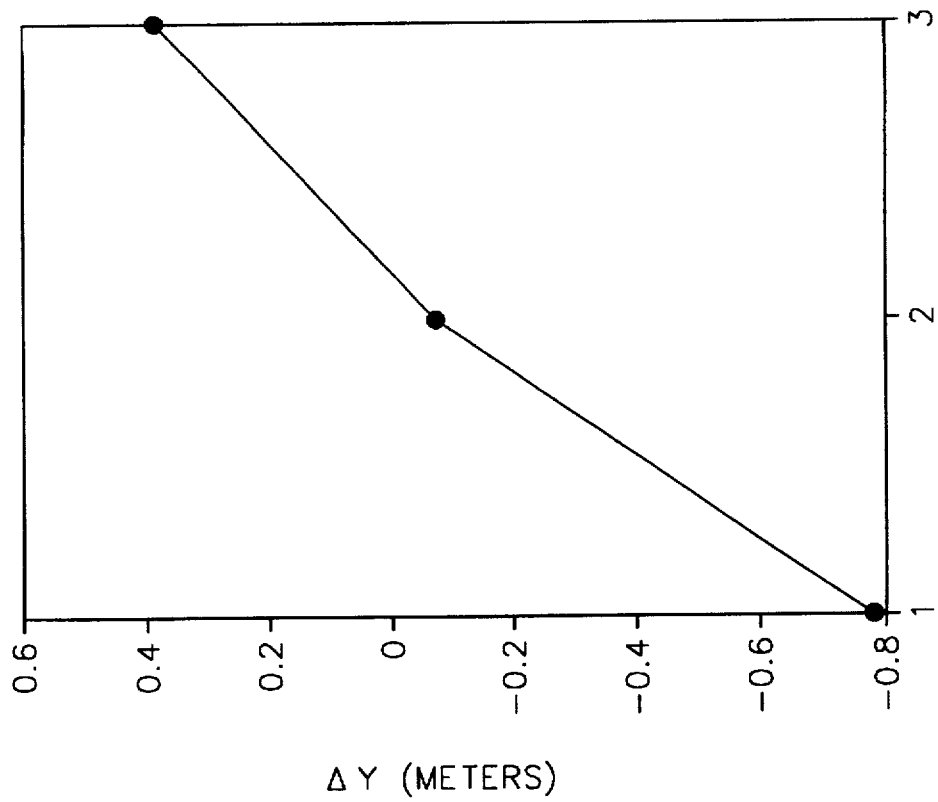
FIGS. 11 and 12 are, respectively, the error in the x and y coordinates after application of the lateral velocity gradient.
Figure 11:
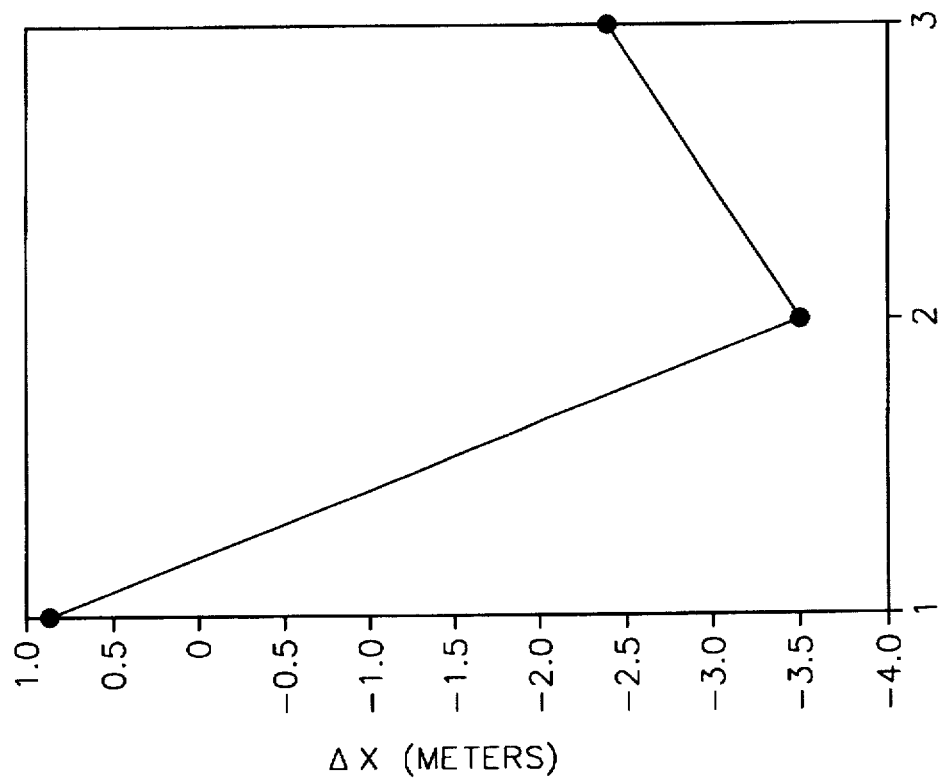

FIGS. 9 and 10 illustrate the residual range errors in $\Delta x$ and in $\Delta y$ after application of the transverse velocity model as given by the polynomial curve 52 of FIG. 6. FIGS. 11 and 12 show significant minimization of the residual error, particularly in the Y coordinates, after applying the lateral velocity trend as given by formulation (19). Please observe that the scales are different in each of the four FIGS. 9–12. That is due to the scale-optimization coding built into the computer graphics routine used to make the plots.

Figure 13:
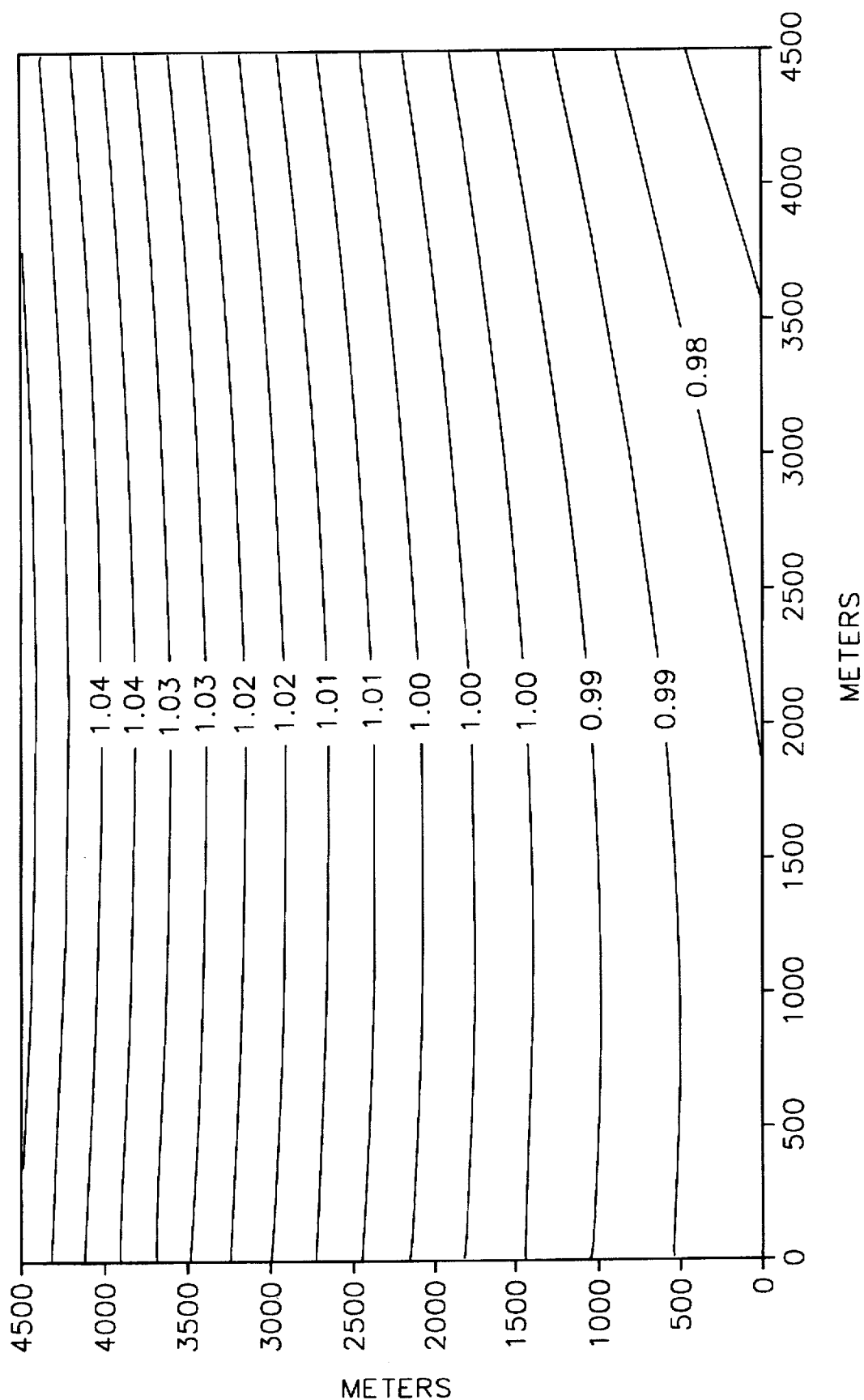
FIG. 13 is a contour map of the lateral velocity gradient from which the updates of FIGS. 11 and 12 were derived.

FIG. 13 is a contour map of the two-dimensional lateral velocity trend as defined by relation (19) in x-y coordinates. The contour values are scalars to be applied to the range $R^c_{ij}$ between any source $SR_i$ and detector $D_j$ calculated from the global regression polynomial for the purpose of minimizing the range error due to lateral velocity gradient.

For computational efficiency, matrix equation (18) can be reformulated using the well-known Helmert blocking technique, a method borrowed from geodetic operations. See for example, Geodetic Glossary, published by the National Geodetic Survey, 1986, published by the U.S. Department of Commerce. Helmert blocking is a method of network adjustment in which the network is broken into a hierarchy of smaller local networks. Adjustment is carried out progressively from the smallest to the next larger members by means of common points. Helmert blocking is a special form of solving by partitioning of the normal matrix where the observations (the source coordinates and the pick times) and the local network of unknowns (the nominal detector coordinates) are partitioned geographically. In this context, the lateral velocity coefficients from equations (9)–(16) are the common points. Additional reference material with respect to Helmert blocking may be gleaned from Working Paper No. 6, entitled *Advanced Least Squares Applied to Position Fixing* by P. A. Cross, North East London Polytechnic, Department of Land Surveying, April, 1983, pp. 115–123.

Figure 14:
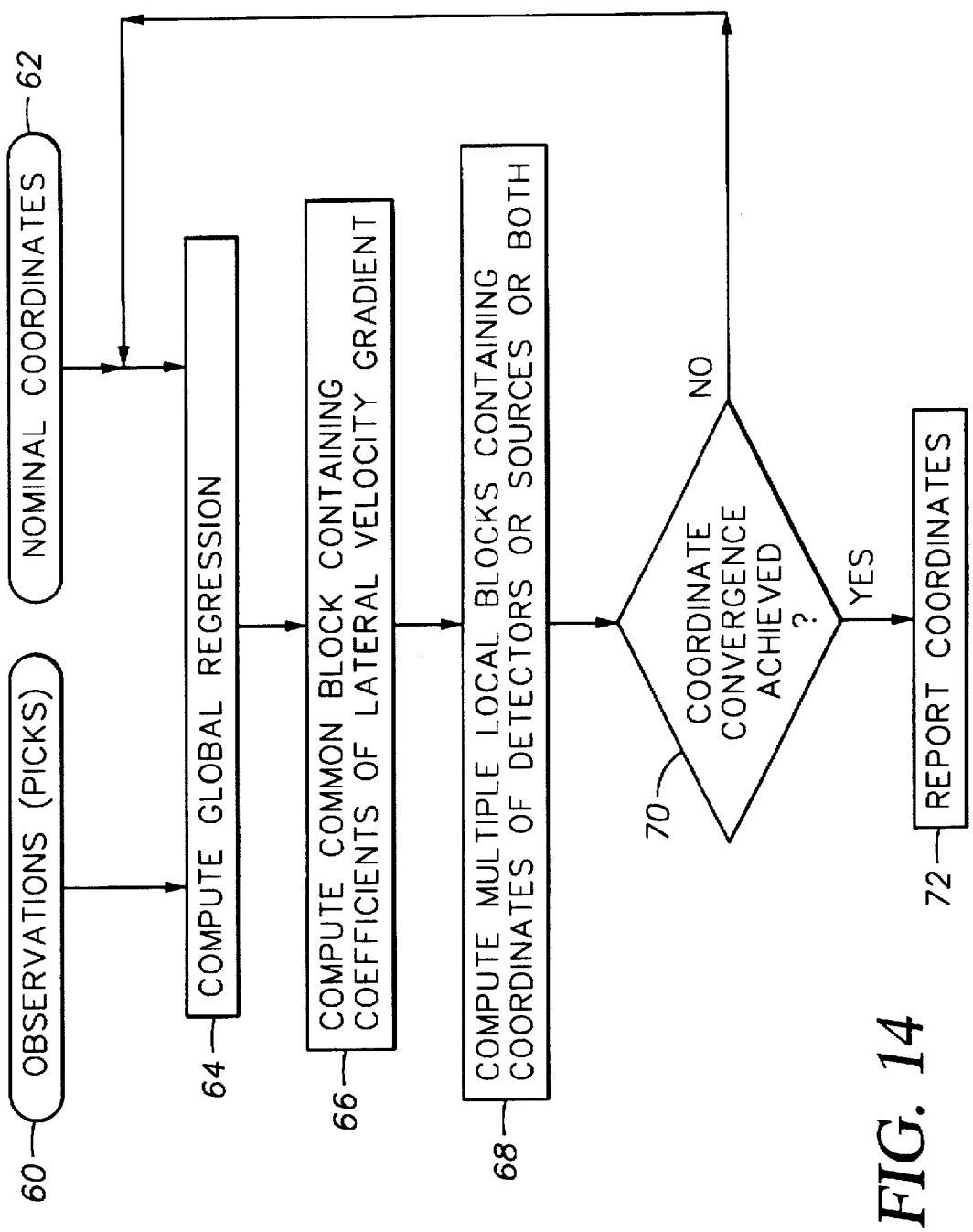
FIG. 14 is a flow diagram for implementing the method of this invention.

In summary, by way of example but not by way of limitation, the presently-preferred best mode of operation is best shown by the flow diagram of FIG. 14.

At step 60, the observations including known source coordinates and measured pick times are entered in a data processing system of any well-known type. At step 62, nominal, vaguely-known detector drop-coordinates are entered. It is desired to re-locate the network of nominal detector positions to minimize the positioning error. Observations and nominal drop coordinates are globally regressed at step 64 to compute pick time distances for each pick time with the global vertical velocity gradient removed with the aid of formulation (A). Using known source coordinates, nominal detector coordinates and the pick time distances with the vertical velocity effect removed, in step 66 a quadratic surface is generated from a two-dimensional, second-order polynomial to provide a common block containing the lateral velocity gradient coefficients. In step 68, using the common-block lateral velocity coefficients, the network of nominal detector locations are updated by application of Helmert adjustment. At step 70, the updated detector coordinates are compared with the nominal detector coordinates. If the difference between the nominal coordinates and the updated coordinates is less than some predefined convergence tolerance, the updated coordinates are accepted, otherwise the process iterates until convergence is achieved.

This invention has been described with a certain degree of specificity by way of example but not by way of limitation. As explained earlier, this invention was described in terms of an exemplary marine survey wherein the locations of the source stations are known accurately as opposed to the detector locations which are merely estimates at best. The reverse situation may also exist wherein the source station locations are uncertain or, perhaps, both source-station and detector locations may be imperfectly known. The Helmert network adjustment technique is preferred but conventional matrix solutions are acceptable. Those skilled in the art will devise obvious variations to the examples given herein but which will fall within the scope and spirit of this invention which is limited only by the appended claims.

What is claimed is:

1. A method for relocating, relative to a geodetic datum, the nominal positions of the members of an array of seismic detectors, the detectors being in communication with a signal processing system, comprising:

a) depositing a plurality of detectors in an array at nominal locations, $D_i$;

b) causing an acoustic source to visit each one of a plurality of geographically-known source locations $SR_j$, and to launch an acoustic wavefield therefrom;

c) determining a set of nominal ranges, $R^n_{i,j}$ between every known source location, $SR_j$, and every nominal detector location, $D_i$;

d) at each wavefield launching, measuring, with said signal processing system, the minimum wavefield travel time between every known source location and every nominal detector location, taken in all combinations, to define a set of pick times, $P_{i,j}$ corresponding to said set of nominal ranges $R^n_{i,j}$;

e) with the aid of the signal processing system, fitting a global polynomial regression curve of the $R^n_{i,j}$ on the P to provide a set of pick time distances (ptd) with the global vertical velocity gradient removed;

f) using the known source coordinates, the nominal detector coordinates and the set of pick time distances, with the aid of the signal processing system, generating a quadratic surface to provide a common block containing the coefficients for modeling the lateral velocity gradient;

g) simultaneously calculating a network of updated local detector coordinates using the common-block coefficients;

h) comparing the updated detector coordinates with the nominal detector coordinates;

i) repeating steps f) through h) until the difference between the nominal and the updated detector coordinates for every detector in said array converge to a preselected limit.

2. The method as defined by claim 1, comprising:

selecting for execution, the order of said polynomial which minimizes the variance of the residuals about the regression curve.

3. The method as defined by claim 1, comprising:

rejecting wavefield arrivals falling inside a critical distance from the set of refracted pick times.

4. The method as defined by claim 1, wherein:

the detector locations are known and the source-station locations are imperfectly known.

5. The method as defined by claim 1, wherein:

said detectors are deposited on an earth formation beneath a body of water so that the pick times are representative of wavefield propagation along shallow refracted trajectories.

6. The method as defined by claim 1, further comprising:

truncating said polynomial between preselected range limits to minimize contamination of said pick times by undesired transients.

* * * * *